US005920455A

United States Patent [19]

Shah et al.

[11] Patent Number: 5,920,455
[45] Date of Patent: *Jul. 6, 1999

[54] ONE STEP ULTRASONICALLY COATED SUBSTRATE FOR USE IN A CAPACITOR

[75] Inventors: Ashish Shah, East Amherst; Barry C. Muffoletto, Alden, both of N.Y.

[73] Assignee: Wilson Greatbatch Ltd., Clarence, N.Y.

[ * ] Notice: This patent is subject to a terminal disclaimer.

[21] Appl. No.: 08/847,219

[22] Filed: May 1, 1997

[51] Int. Cl.[6] .............................. H01G 9/00; H01G 9/04

[52] U.S. Cl. .......................... 361/502; 361/508; 361/516; 361/528; 361/532; 427/79

[58] Field of Search .................................... 361/502–503, 361/508–509, 511, 516–518, 522–523, 529, 530, 532, 535–537; 29/25.03; 427/57, 79; 204/290

[56] References Cited

U.S. PATENT DOCUMENTS

| | | | |
|---|---|---|---|
| 4,242,374 | 12/1980 | Sansregret | 427/76 |
| 4,618,508 | 10/1986 | Blandenet et al. | 427/57 |
| 5,002,928 | 3/1991 | Fukui et al. | 505/1 |
| 5,098,485 | 3/1992 | Evans | 148/272 |
| 5,157,015 | 10/1992 | Snyder et al. | 505/1 |
| 5,278,138 | 1/1994 | Ott et al. | 505/1 |
| 5,366,770 | 11/1994 | Wang | 505/477 |
| 5,384,685 | 1/1995 | Tong et al. | 361/503 |
| 5,464,453 | 11/1995 | Tong et al. | 29/25.03 |

*Primary Examiner*—Dean A. Reichard
*Assistant Examiner*—Anthony Dinkins
*Attorney, Agent, or Firm*—Hodgson, Russ, Andrews, Woods& Goodyear LLP

[57] ABSTRACT

A deposition process for coating a substrate with an ultrasonically generated aerosol spray of a pseudocapacitive material or a precursor thereof contacted to a substrate heated to a temperature to instantaneously solidify the pseudocapacitive material or convert the precursor to a solidified pseudocapacitive metal compound, is described. The ultrasonic aerosol droplets are much smaller in size than those produced by conventional processes and the heated substrate minimizes the possibility of contamination, thereby providing the present coating having an increased surface area. When the coated substrate is an electrode in a capacitor, a greater surface area results in an increased electrode capacitance.

18 Claims, 8 Drawing Sheets

ONE STEP ULTRASONICALLY COATED SUBSTRATE FOR USE IN A CAPACITOR

BACKGROUND OF THE INVENTION

1. Field of the Invention

The present invention generally relates to a deposition process for coating a substrate with an ultrasonically generated aerosol spray. More particularly, the present invention relates to a metallic foil provided with an ultrasonically generated aerosol spray. Still more particularly, the present invention provides a porous, high surface area metal oxide, metal nitride, metal carbon nitride or metal carbide coating on a conductive foil for use in a capacitor and the like.

2. Prior Art

In redox active structures, energy storage occurs during a change in the oxidation state of the metal when an ionic species from a conducting electrolyte, for example a proton, reacts with the surface or bulk of the oxide. This chemisorption is accompanied by the simultaneous incorporation of an electron into the oxide. The surface (or bulk) interaction between the electrode and electrolyte gives rise to capacitance in the hundreds of $\mu$F/sq.cm. It follows that a electrode with high specific surface area will store a significant amount of energy and will have a large specific capacitance. These electrodes are then appropriate when used as the anode and/or cathode in electrochemical capacitors or as cathodes in electrolytic capacitors, which require high specific capacitances.

Whether an anode or a cathode in an electrochemical capacitor or the cathode in an electrolytic capacitor, a capacitor electrode generally includes a substrate of a conductive metal such as titanium or tantalum provided with a semiconductive or pseudocapacitive oxide coating, nitride coating, carbon nitride coating, or carbide coating. In the case of a ruthenium oxide cathode, the coating is formed on the substrate by dissolving a ruthenium oxide precursor such as ruthenium chloride or ruthenium nitrosyl nitrate in a solvent. The solution is contacted to a substrate heated to a temperature sufficient to, for all intents and purposes, instantaneously convert the deposited precursor to a highly porous, high surface area pseudocapacitive film of ruthenium oxide provided on the substrate.

The prior art describes various methods of contacting the substrate with the semiconductive or pseudocapacitive solution, or precursor thereof. Commonly used techniques include dipping and pressurized air atomization spraying of the pseudocapacitive material onto the substrate. Capacitance values for electrodes made by dipping, pressurized air atomization spraying and sputtering are lower in specific capacitance. Sol-gel deposition is another conventional method of coating the substrate. It is exceptionally difficult to accurately control the coating morphology due to the controllability and repeatability of the various prior art techniques, which directly impacts capacitance.

Therefore, while electrochemical capacitors provide much higher energy storage densities than conventional capacitors, there is a need to further increase the energy storage capacity of such devices. One way of accomplishing this is to provide electrodes which can be manufactured with repeatably controllable morphology according to the present invention, in turn benefiting repeatably increased effective surface areas.

SUMMARY OF THE INVENTION

The present invention describes the deposition of an ultrasonically generated, aerosol spray of a pseudocapacitive metal compound or a precursor of the compound onto a heated conductive substrate The heated substrate serves to instantaneously solidify the compound and in the case of the solution containing a precursor, convert the precursor to the pseudocapacitive metal compound provided on the substrate in a solid form. When a liquid is ultrasonically atomized, the resultant droplets are much smaller in size than those produced by a pressurized air atomizer and the like, i.e., on the order of microns and submicrons in comparison to predominately tens to hundreds of microns, which results in a greater surface area coating. Therefore, the capacitance of pseudocapacitors can be further improved by using an electrode coated with an ultrasonically deposited porous film to increase the surface area of the electrodes. Additionally, depositing the aerosol onto a heated substrate results in fewer process steps, minimization of contamination of the coating by reducing process locations, increased surface area for the coating by reducing moisture absorption, and the like. The benefits result in a coated substrate that is useful as an electrode in a capacitor and the like having increased energy storage capacity.

These and other aspects of the present invention will become more apparent to those skilled in the art by reference to the following description and the appended drawings.

DESCRIPTION OF THE PREFERRED EMBODIMENTS

Figure 1:
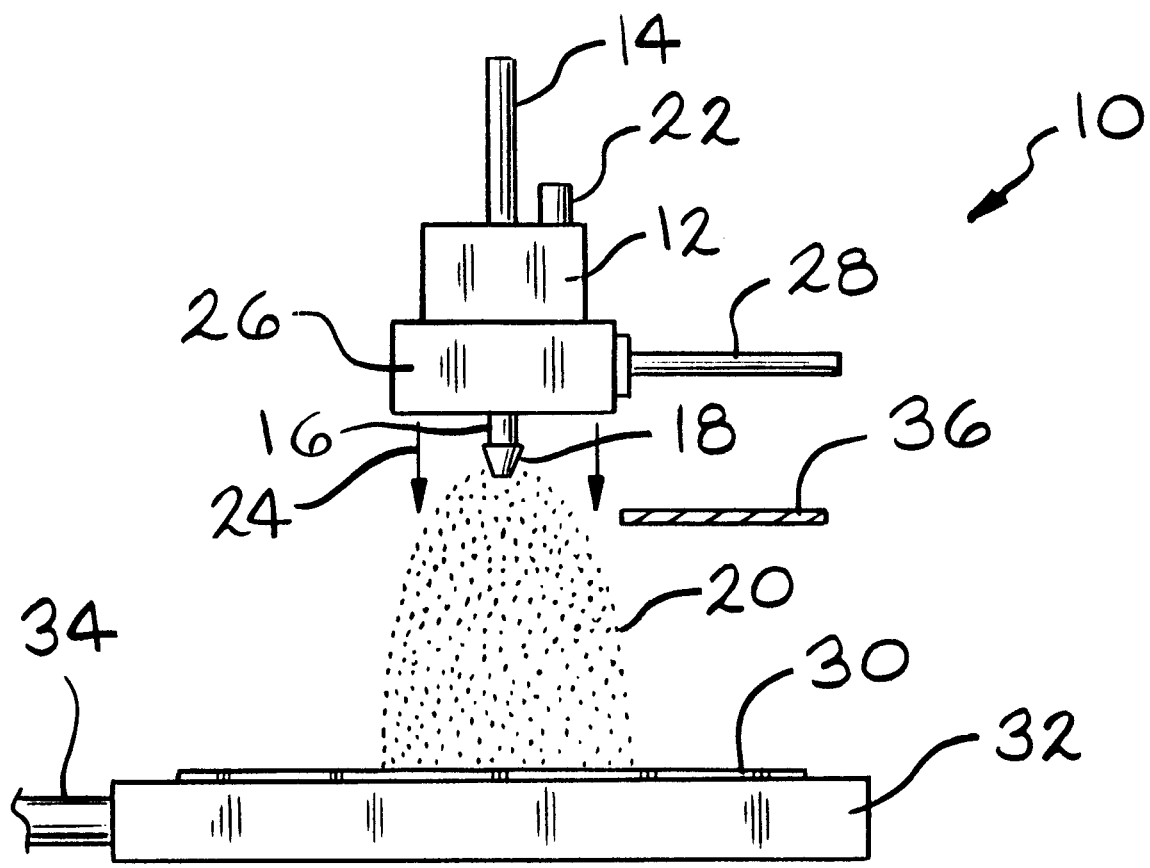
FIG. 1 is an elevational view of an ultrasonic aerosol deposition apparatus 10 according to the present invention.

Referring now to the drawings, FIG. 1 illustrates a preferred ultrasonic aerosol deposition apparatus 10 according to the process of the present invention. While not shown in the figure, the first step in the process includes providing a solution of reagents that are intended to be formed into an ultrasonically generated aerosol according to the present invention. The reagent solution is fed into or otherwise provided in a reagent chamber 12 via a feed line 14. The reagent solution preferably contains ions in substantially the ratio needed to form the desired coating from the ultrasonically generated aerosol. These ions are preferably available in solution in water soluble form such as in water soluble salts. However, salts including nitrates, sulfates and phosphates of the cations which are soluble in other solvents such as organic and inorganic solvents may be used. Water soluble salts include nitrates and chlorides. Other anions which form soluble salts with the cations also may be used.

The reagent solution in the chamber 12 is moved through a conduit 16 to an ultrasonic nozzle 18. The reagent solution is caused to spray from the nozzle 18 in the form of an aerosol 20, such as a mist, by any conventional means which causes sufficient mechanical disturbance of the reagent solution. In this description, the term aerosol 20 refers to a suspension of ultramicroscopic solid or liquid particles in air or gas having diameters of from about 0.1 microns to about 100 microns and preferably less than about 20 microns. Examples include smoke, fog and mist. In this description, the term mist refers to gas-suspended liquid particles having diameters less than about 20 microns.

In the preferred embodiment of the present invention, the aerosol/mist 20 is formed by means of mechanical vibration including ultrasonic means such as an ultrasonic generator (not shown) provided inside reagent chamber 12. The ultrasonic means contacts an exterior surface of the conduit 16 and the ultrasonic nozzle 18 assembly. Electrical power is provided to the ultrasonic generator through connector 22. As is known to those skilled in the art, ultrasonic sound waves are those having frequencies above 20,000 hertz. Preferably, the ultrasonic power used to generate the aerosol/mist 20 is in excess of one-half of a watt and, more preferably, in excess of one watt. By way of illustration, an ultrasonic generator useful with the present invention is manufactured by Sonotek of Milton, N.Y. under model no. 8700-120MS.

It should be understood that the oscillators (not shown) of the ultrasonic generator may contact an exterior surface of the reagent chamber 12 such as a diaphragm (not shown) so that the produced ultrasonic waves are transmitted via the diaphragm to effect misting of the reagent solution. In another embodiment of the present invention, the oscillators used to generate the aerosol/mist 20 are in direct contact with the reagent solution. The reagent chamber 12 may be any reaction container used by those skilled in the art and should preferably be constructed from such weak acid-resistant materials as titanium, stainless steel, glass, ceramic and plastic, and the like.

As the aerosol/mist 20 sprays from the ultrasonic nozzle 18, the spray is contained by a shroud gas represented by arrows 24. The shroud gas 24 does not contact the reagent solution prior to atomization, but instead sprays from a plurality of shroud gas nozzles (not shown) supported by an air shroud chamber 26 serving as a manifold for the nozzles disposed in an annular array around the ultrasonic nozzle 18. The shroud gas 24 is introduced into the air shroud chamber 26 via feed line 28 and discharges from the shroud gas nozzles at a flow rate sufficient to screen and direct the aerosol/mist 20 toward a heated substrate 30 supported on a holder or a support block 32. For example, with the aerosol/mist 20 spraying from the ultrasonic nozzle 18 at a flow rate of from about 0.1 cc to 10 cc per minute, the flow rate of the shroud gas 24 is from about 500 cc to about 25 liters per minute.

Substantially any gas which facilitates screening, directing and shaping the aerosol 20 may be used as the shroud gas 24. For example, the shroud gas may comprise oxygen, air, argon, nitrogen, and the like. It is preferred that the shroud gas 24 be a compressed gas under a pressure in excess of 760 millimeters of mercury. Thus, the compressed shroud gas 24 facilitates the spraying of the aerosol/mist 20 from the ultrasonic nozzle 18 onto the substrate 30.

Substrate 30 preferably consists of a conductive metal such as titanium, molybdenum, tantalum, niobium, cobalt, nickel, stainless steel, tungsten, platinum, palladium, gold, silver, copper, chromium, vanadium, aluminum, zirconium, hafnium, zinc and iron, and the like, and mixtures and alloys thereof.

Regardless of the material of substrate 30, ultrasonically deposited spray coatings rely mostly upon mechanical bonding to the substrate surface. It is, therefore, critical that the substrate surface to be coated is properly prepared to ensure coating quality. For one, substrate surface cleanliness is very important in all coating systems, especially in ultrasonically deposited spray coatings. In that respect, it is required that the substrate surface remain uncontaminated by lubricants from handling equipment or body oils from hands and the like. Substrate cleaning includes chemical means such as conventional degreasing treatments using aqueous and non-aqueous solutions as well known to those skilled in the art. Plasma cleaning is also contemplated by the scope of the present invention.

After substrate surface cleaning, surface roughness is the next most critical factor for properly applying an ultrasonically deposited spray coating. The substrate 30 may be roughened by chemical means, for example, by contacting the substrate with hydrofluoric acid and/or hydrochloric acid containing ammonium bromide and methanol and the like, by plasma etching, and by mechanical means such as scraping, machining, wire brushing, rough threading, grit blasting, a combination of rough threading then grit blasting and abrading such as by contacting the substrate with Scotch-Brite™ abrasive sheets manufactured by 3M.

It is further contemplated by the scope of the present invention that, if desired, the electrical conductivity of substrate is improved prior to coating. Metal and metal alloys have a native oxide present on their surface. This is a resistive layer and hence, if the material is to be used as a substrate for a capacitor electrode, the oxide is preferably removed or made electrically conductive prior to deposition of a pseudocapacitive coating thereon. In order to improve the electrical conductivity of the substrate, various techniques can be employed. One is shown and described in U.S. Pat. No. 5,098,485 to Evans, the disclosure of which is hereby incorporated by reference. A preferred method for improving the conductivity of the substrate includes depositing a minor amount of a metal or metals from Groups IA, IVA and VIIIA of the Periodic Table of Elements onto the substrate. Aluminum, manganese, nickel and copper are also suitable for this purpose. The deposited metal is then "intermixed" with the substrate material by, for example, a high energy ion beam or a laser beam directed towards the deposited surface. These substrate treating processes are performed at relatively low temperatures to prevent substrate degradation and deformation. Additionally, these treating processes can be used to passivate the substrate from further chemical reaction while still providing adequate electrical conductivity. For additional disclosure regarding improving the electrical conductivity of the substrate 30 prior to deposition, reference is made to simultaneously filed patent application entitled "Method of Improving Electrical Conductivity of Metals, Metal Alloys and Metal Oxides" U.S. patent application Ser. No. 08/847,946, which is assigned to the present invention and incorporated herein by reference.

The reagent solution preferably contains ions in substantially the stoichiometric ratio needed to form the desired coating. In one embodiment, the ions are present in the reagent solution in a water-soluble form as water-soluble salts. Suitable water-soluble salts include nitrates and chlorides of the cations Alternatively, salts such as sulfates and phosphates soluble in organic and inorganic solvents other than water may be used. Some of these other solvents include isopropyl alcohol and nitric acid and the like, and mixtures thereof.

The aerosol/mist contacted substrate 30 consists essentially of a porous film coating (not shown) including the oxide of a first metal, or a precursor thereof, the nitride of the first metal, or a precursor thereof, the carbon nitride of the first metal, or a precursor thereof, and/or the carbide of the first metal, or a precursor thereof, the oxide, nitride, carbon nitride and carbide of the first metal having pseudocapacitive properties. The first metal is preferably selected from the group consisting of ruthenium, cobalt, manganese, molybdenum, tungsten, tantalum, iron, niobium, iridium, titanium, zirconium, hafnium, rhodium, vanadium, osmium, palladium, platinum, and nickel. For example, in the case where it is intended that the resulting pseudocapacitive film is an oxide of one of the above listed first metals, the deposited mixture can include a nitrate or a chloride of the metal.

The porous coating may also include a second or more metals. The second metal is in the form of an oxide, a nitride, a carbon nitride or a carbide, or precursors thereof and is not essential to the intended use of the coated foil as a capacitor electrode and the like. The second metal is different than the first metal and is selected from one or more of the group consisting of tantalum, titanium, nickel, iridium, platinum, palladium, gold, silver, cobalt, molybdenum, ruthenium, manganese, tungsten, iron, zirconium, hafnium, rhodium, vanadium, osmium, and niobium. In a preferred embodiment of the invention, the porous coating product includes oxides of ruthenium and tantalum.

In general, as long as the metals intended to comprise the coating are present in solution in the desired stoichiometry, it does not matter whether they are present in the form of a salt, an oxide, or in another form. However, preferably the solution contains either the salts of the coating metals, or their oxides The reagent solution is preferably at a concentration of from about 0.01 to about 1,000 grams of the reagent compounds per liter of the reagent solution. In one embodiment of the present invention, it is preferred that the reagent solution has a concentration of from about 1 to about 300 grams per liter and, more preferably, from about 5 to about 40 grams per liter.

The support block 32 for substrate 30 is heated via a power cable 34. In the case where the reagent solution contains a pseudocapacitive metal compound and during the ultrasonic spray deposition of the aerosol/mist 20 onto the substrate 30, support block 32 maintains the substrate 30 at a temperature sufficient to instantaneously evaporate or otherwise drive off the solvent from the deposited reagent mixture. When the deposited film coating is comprised of a precursor of the pseudocapacitive metal compound, the support block 32 maintains the substrate 30 at a temperature sufficient to instantaneously convert the precursor to a porous, high surface area metal oxide, metal nitride, metal carbon nitride or metal carbide coating on the substrate 30, as the case may be.

Thus, as the substrate 30 is being coated with the pseudocapacitive metal solution, or precursor thereof, the substrate is at a temperature sufficient to drive off or otherwise evaporate the solvent material to provide a solid, anhydrous form of the pseudocapacitive metal compound on the substrate. According to the present invention, the solvent is instantaneously evaporated from the aerosol/mist 20 with contact to the substrate resulting in the deposition of a relatively thin film coating of an oxide of the first metal. In the case of the solution containing a precursor of the pseudocapacitive metal compound, the heated substrate also instantaneously converts the precursor to the final product in accordance to the present invention.

According to the present invention, when the resulting film is intended to be an oxide, the deposited nitrate or chloride mixture is instantaneously heated by contact with the substrate provided at a temperature sufficient to convert the deposited precursor to a highly porous, high surface area pseudocapacitive film. More particularly, as the oxide precursor aerosol/mist 20 is spraying onto the heated substrate 30, the substrate is at a temperature of about 100° C. to about 500° C., preferably about 350° C. to instantaneously convert the precursor to an oxide coating. After deposition and conversion to the pseudocapacitive compound, the substrate may be ramped down or cooled to ambient temperature, maintained at the heated deposition temperature, or varied according to a specific profile. In general, it is preferred to conduct this heating while contacting the substrate with air or an oxygen-containing gas.

Alternatively and as described is simultaneously filed patent application entitled "Ultrasonically Coated Substrate For Use In A Capacitor And Method of Manufacture" U.S. patent application Ser. No. 08/858,150, the ultrasonically generated aerosol is sprayed onto the substrate maintained at a temperature sufficient to evaporate or otherwise drive off the solvent from the deposited reagent mixture. When the deposited film coating is comprised of a precursor of the pseudocapacitive melted compound, the coated substrate is then subjected to a separate heating step to convert the precursor to the final product. The simultaneously filed patent application is assigned to the assignee of the present invention and incorporated herein by reference.

It is preferred that the resulting porous coating, whether it be of an oxide, a nitride, a carbon nitride or a carbide, have a thickness of from about a few hundred Angstroms to about 0.1 millimeters or more. The porous coating has an internal surface area of about 10 $m^2$/gram to about 1,500 $m^2$/gram. In general, the thickness of substrate 30 is typically in the range of about 0.001 millimeters to about 2 millimeter and preferably about 0.1 millimeters.

During aerosol/mist 20 deposition, temperature sensing means (not shown) are used to sense the temperature of the substrate 30 and to adjust the power supplied to the support block 32 to regulate the substrate temperature as previously described.

One advantage of the present process is that the substrate 30 may be of substantially any size or shape, and it may be stationary or movable. Because of the speed of the coating process, the substrate 30 may be moved across the spray emitting from nozzle 18 to have any or all of its surface coated with the film. The substrate 30 is preferably moved in a plane which is substantially normal to the direction of flow of the aerosol region 20. In another embodiment, the substrate 30 is moved stepwise along a predetermined path to coat the substrate only at certain predetermined areas. In another embodiment of the present process, rotary substrate motion is utilized to expose the surface of a complex-shaped article to the aerosol coating. This rotary substrate motion may be effected by conventional means.

The process of the present invention provides for coating the substrate 30 at a deposition rate of from about 0.01 to about 10 microns per minute and, preferably, from about 0.1 to about 1.0 microns per minute. The thickness of the film coated upon the substrate 30 may be determined by means well known to those skilled in the art.

The present aerosol spray deposition process provides a substantial amount of flexibility in varying the porosity and morphology of the deposited film. By varying such parameters as the concentration of the reagent solution (a higher concentration of the metal constituents produces a larger particle size as well as a higher deposition rate), the temperature of the substrate (the higher the substrate temperature, the larger the size of the grains deposited), energy supplied by the ultrasonic generator (the greater the energy, the faster the deposition rate) and ultrasonic frequency (the higher the frequency, the smaller the particle size resulting in a higher surface area aerosol deposited film), the porosity and morphology of the deposited film coated onto the substrate 30 is controlled. Also, the temperature of the substrate affects the crystal structure and coating adhesion strength.

It is preferred that the generation of the aerosol/mist 20 and its deposition onto the substrate 30 is conducted under substantially atmospheric pressure conditions. As used in this specification, the term "substantially atmospheric" refers to a pressure of at least about 600 millimeters of mercury and, preferably, from about 600 to about 1,000 millimeters of mercury. It is preferred that the aerosol generation occurs at about atmospheric pressure. As is well known to those skilled in the art, atmospheric pressure at sea level is 760 millimeters of mercury.

Figure 2:
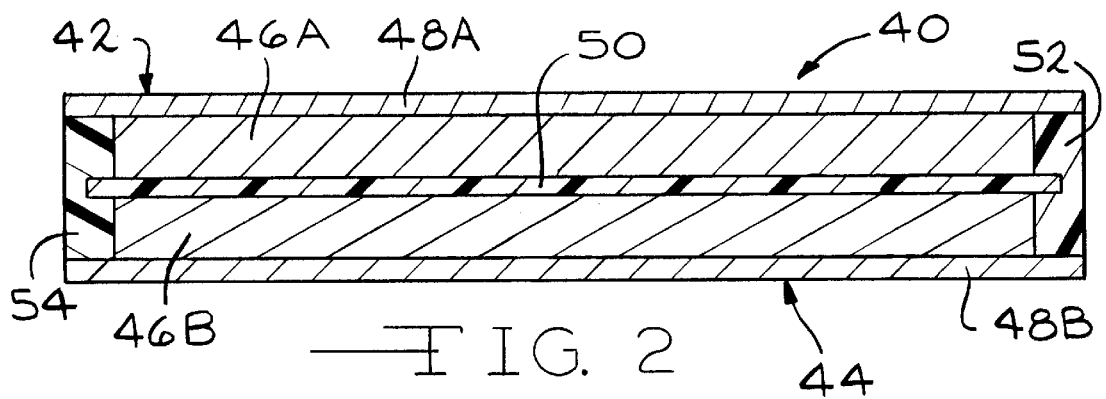
FIG. 2 is a schematic of a unipolar electrode configuration for use in an electrochemical capacitor.

An ultrasonically coated substrate according to the present invention is useful as an electrode in various types of electrochemical capacitors including unipolar and bipolar designs, and capacitors having a spirally wound configuration. For example, in FIG. 2 there is shown a schematic representation of a typical unipolar electrochemical capacitor 40 having spaced apart electrodes 42 and 44 One of the electrodes, for example, electrode 42, serves as the cathode electrode and comprises an ultrasonically generated aerosol coating 46A of pseudocapacitive material provided on a conductive plate 48A according to the present invention. For example, a porous ruthenium oxide film is provided on plate 48A which is of a conductive material such as tantalum. The relative thicknesses of the plate 48A and the pseudocapacitive coating 46A thereon are distorted for illustrative purposes. As previously described, the plate is about 0.01 millimeters to about 1 millimeter in thickness and the pseudocapacitive coating 46A is in the range of about a few hundred Angstroms to about 0.1 millimeters thick. The other electrode 44 serves as the anode and is of a similar pseudocapacitive material 46B contacted to a conductive substrate 48B, as in electrode 42.

The cathode electrode 42 and the anode electrode 44 are separated from each other by an ion permeable membrane 50 serving as a separator. The electrodes 42 and 44 are maintained in the spaced apart relationship shown by opposed insulating members 52 and 54 such as of an elastomeric material contacting end portions of the plates 48A, 48B. The end plate portions typically are not coated with a pseudocapacitive material. An electrolyte (not shown), which may be any of the conventional electrolytes used in electrolytic capacitors, such as a solution of sulfuric acid, potassium hydroxide, or an ammonium salt is provided between and in contact with the cathode and anode electrodes 42 and 44. Leads (not shown) are easily attached to the electrodes 42 and 44 before, during, or after assembly of the capacitor and the thusly constructed unipolar capacitor configuration is housed in a suitable casing, or the conductive plates along with the insulating members can serve as the capacitor housing.

Figure 3:
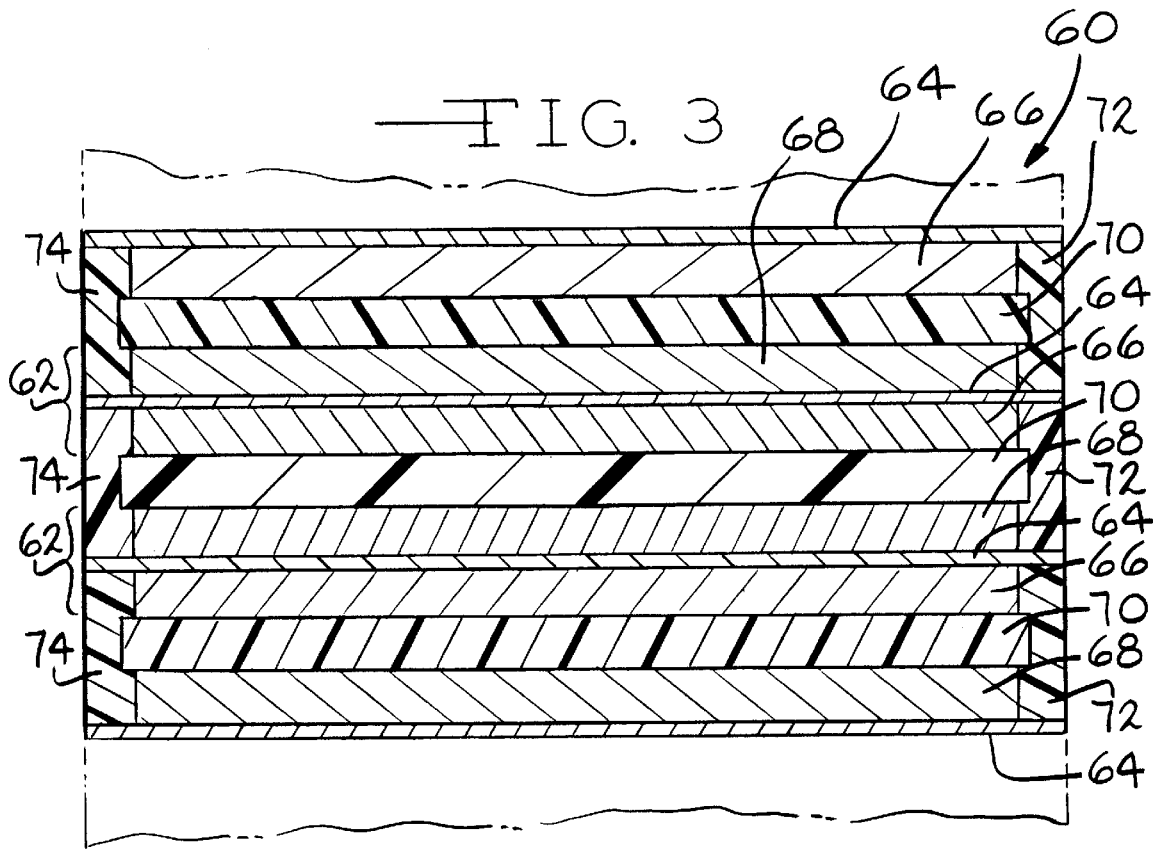
FIG. 3 is a schematic of a bipolar electrode configuration for use in an electrochemical capacitor.

FIG. 3 is a schematic representation of a typical bipolar electrochemical capacitor 60 comprising a plurality of capacitor units 62 arranged and interconnected serially. Each unit 62 includes bipolar conductive substrate 64. Porous pseudocapacitive coatings 66 and 68 are provided on the opposite sides of substrate 64 according to the present ultrasonic coating process. For example, a porous coating of ruthenium oxide film is deposited from an ultrasonically generated aerosol onto both sides of substrate 64. Again, the thickness of the porous coatings 66 and 68 is distorted for illustrative purposes. The units 62 are then assembled into the bipolar capacitor configuration on opposite sides of an intermediate separator 70. Elastomeric insulating members 72 and 74 are provided to maintain the units 62 in their spaced apart relationship. Materials other than elastomeric materials may be apparent to those skilled in the art for use as insulators 72, 74. As shown in the dashed lines, a plurality of individual electrochemical capacitor units 62 are interconnected in series to provide the bipolar configuration. The serial arrangement of units 62 is completed at the terminal ends thereof by end plates (not shown), as is well known to those skilled in the art. As is the situation with the unipolar capacitor configuration previously described, an electrolyte 74 is provided between and in contact with the coatings 66, 68 of the capacitor 60.

Figure 4:
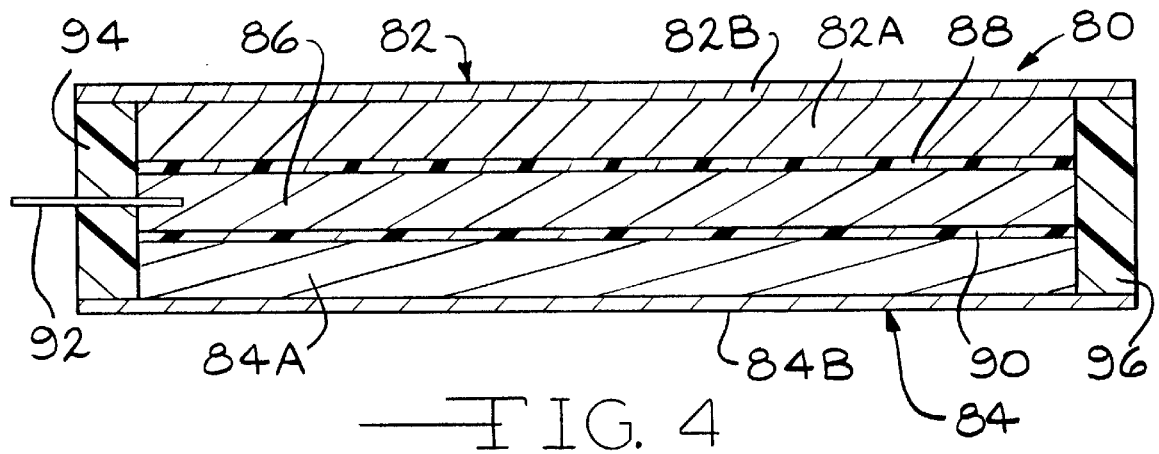
FIG. 4 is a schematic of a hybrid capacitor according to the present invention.

FIG. 4 shows a schematic representation of an electrolytic capacitor 80 having spaced apart cathode electrode 82, 84, each comprising a respective ultrasonically generated aerosol coating 82A, 84A of pseudocapacitive material provided on a conductive plate 82B, 84B according to the present invention. The counter electrode or anode 86 is intermediate the cathodes 82, 84 with separators 88, 90 preventing contact between the electrodes. The anode 86 is of a conventional sintered, metal, preferably in a porous form. Suitable anode metals are selected from the group consisting of titanium, aluminum, niobium, zirconium, hafnium, tungsten, molybdenum, vanadium, silicon, germanium and tantalum contacted to a terminal pin 92. The hybrid capacitor 80 is completed by insulating members 94, 96 contacting end portions of the cathode plates. While not shown, an electrolyte is provided to activate the electrodes 82, 84 and 86.

Figure 5:
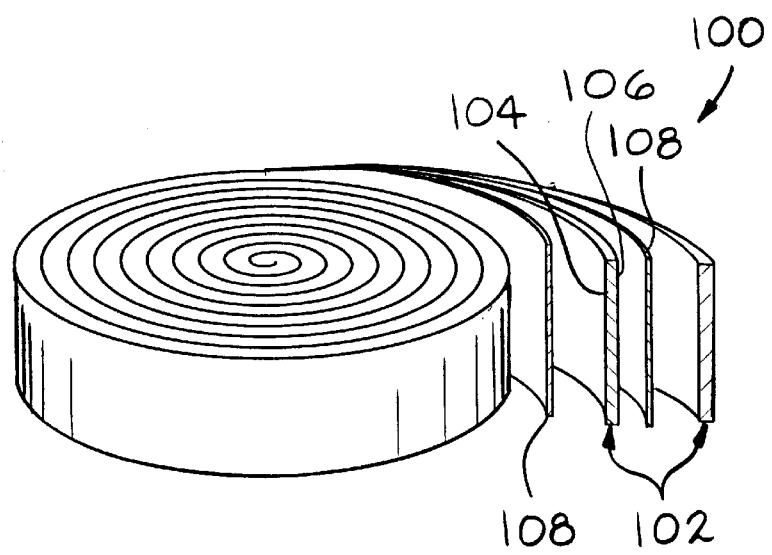
FIG. 5 is a schematic of a spirally wound configuration for use in a electrochemical capacitor.

FIG. 5 is a schematic drawing of another embodiment of a jelly roll configured capacitor 100, which can be manufactured by the ultrasonic coating process according to the present invention. Capacitor 100 has a plurality of capacitor units 102, each comprising a conductive substrate provided with ultrasonically generated pseudocapacitive coatings 104, 106 on the opposed sides thereof. The coatings can be, for example, of ruthenium oxide, separated from immediately adjacent cells by an intermediate separator 108. This structure is then wound in a jelly roll fashion and housed in a suitable casing. Leads are contacted to the anode and cathode electrodes and the capacitor is activated by an electrolyte in the customary manner.

The following example describes the manner and process of coating a substrate according to the present invention, and they set forth the best mode contemplated by the inventors of carrying out the invention, but they are not to be construed as limiting.

EXAMPLE I

A precursor solution was prepared by dissolving 2.72 grams of ruthenium nitrosyl nitrate in a solvent that consisted of 100 cc of deionized water. If needed, a minor amount, i.e. about 5 cc of nitric acid is used to completely solubilize the precursor. The solution was stirred until the ruthenium nitrosyl nitrate was completely dissolved. A Becton-Dickinson, 30 cc. syringe was filled with the precursor solution and installed in the syringe pump. The pump was set to an injection flow rate of 2 cc/minute. The ruthenium precursor solution was then ready to be sprayed using the ultrasonic aerosol generator (Sonotek).

The substrate was cleaned with appropriate cleaning solutions and mounted on the temperature controlled substrate holder. The substrate was a tantalum foil, 0.002" thick. The foil was heated to a temperature of 350° C. The ultrasonic nozzle was positioned above the substrate at a height of 7 cm. The power to the nozzle was set to 1.0W. The shroud gas, dry and filtered air, was turned on and set to a flow rate of 15 scfh at 10 psi. This shroud gas behaves as the carrier gas and also acts as an aerosol mist shaping gas. After the foil temperature stabilized the syringe pump was turned on. As the liquid precursor was pumped through the nozzle it was atomized into tiny droplets. The droplets were deposited on the heated substrate where the solvent evaporated and a ruthenium nitrosyl nitrate film was created on the surface of the foil. The foil temperature of 350° C. was sufficient to convert the ruthenium nitrosyl nitrate to ruthenium oxide as the aerosol was being deposited. On completion of the spraying, the film was allowed to remain on the heater block for half an hour in order to ensure that all the nitrate had been converted to the oxide.

CONCLUSION

When a liquid is ultrasonically atomized, the droplet size in the aerosol/mist is smaller than that produced by the various prior art techniques previously discussed. This results in greater control over the manufacturing process in terms of controlling the coating morphology from one production run to the next. Also, there is less overspraying with the present process in comparison to pressurized air atomization spraying and the like. Furthermore, the use of an ultrasonically generated aerosol deposited on a conductive substrate to form an electrode for a capacitor according to the present invention provides a higher surface area coating than that obtainable by the prior art, and thus a higher capacitance electrode.

Figure 6:
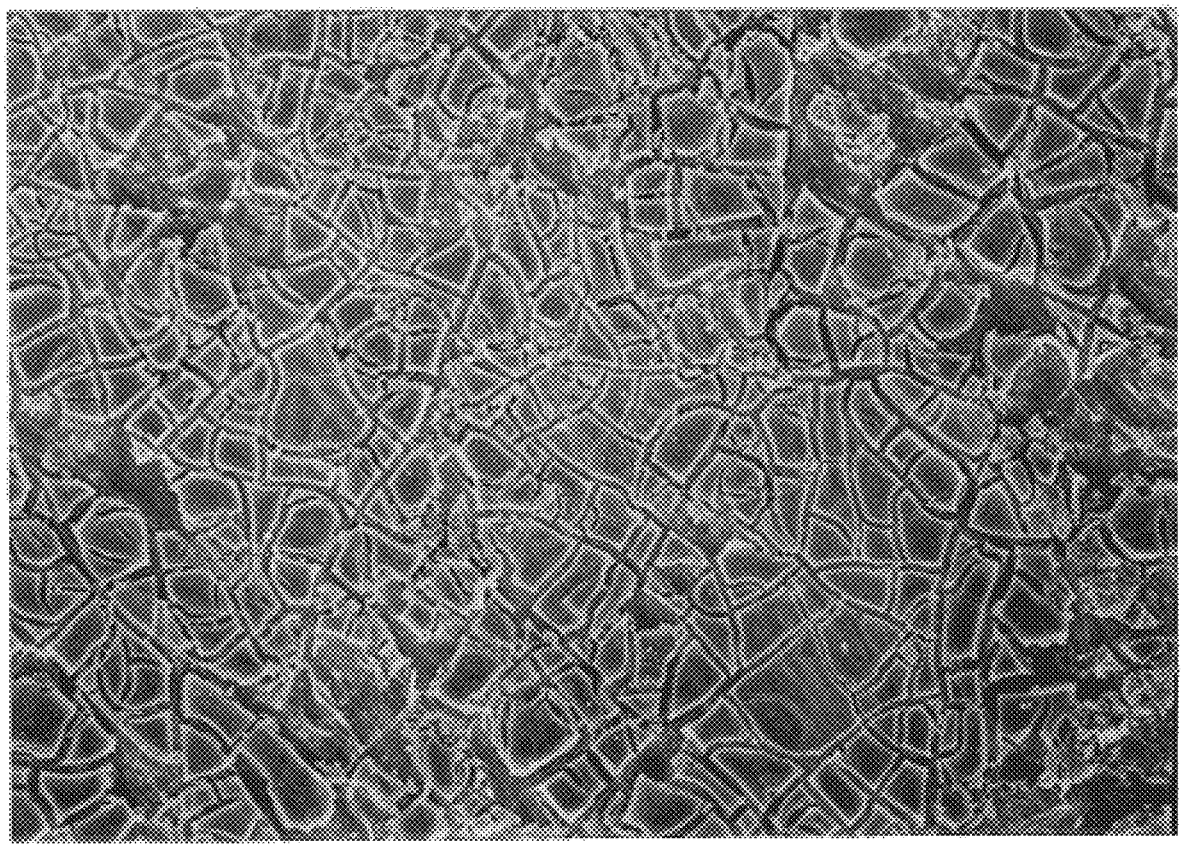
FIGS. 6 and 7 are photographs taken through an electron microscope at 500x and 5,000x, respectively, showing the surface condition of a ruthenium oxide coating produced by pressurized air atomization spraying according to the prior art.
Figure 7:
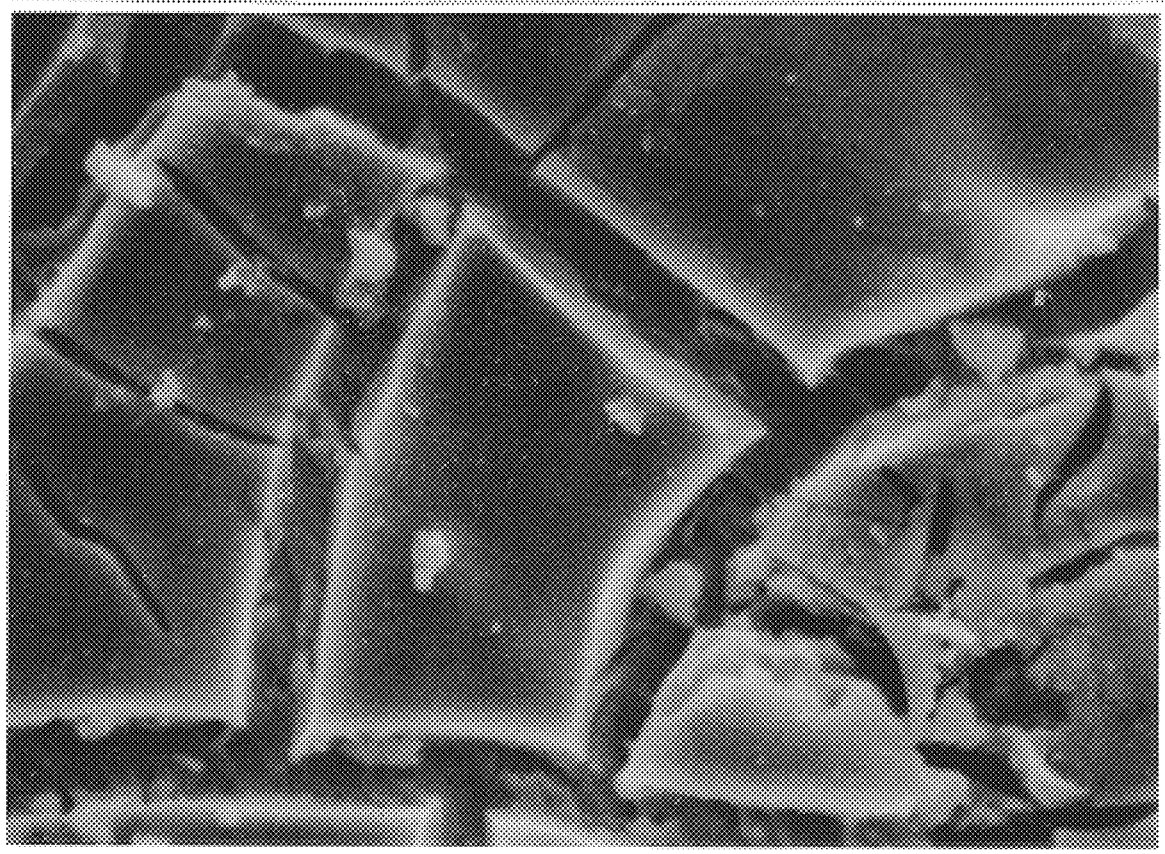
Figure 8:
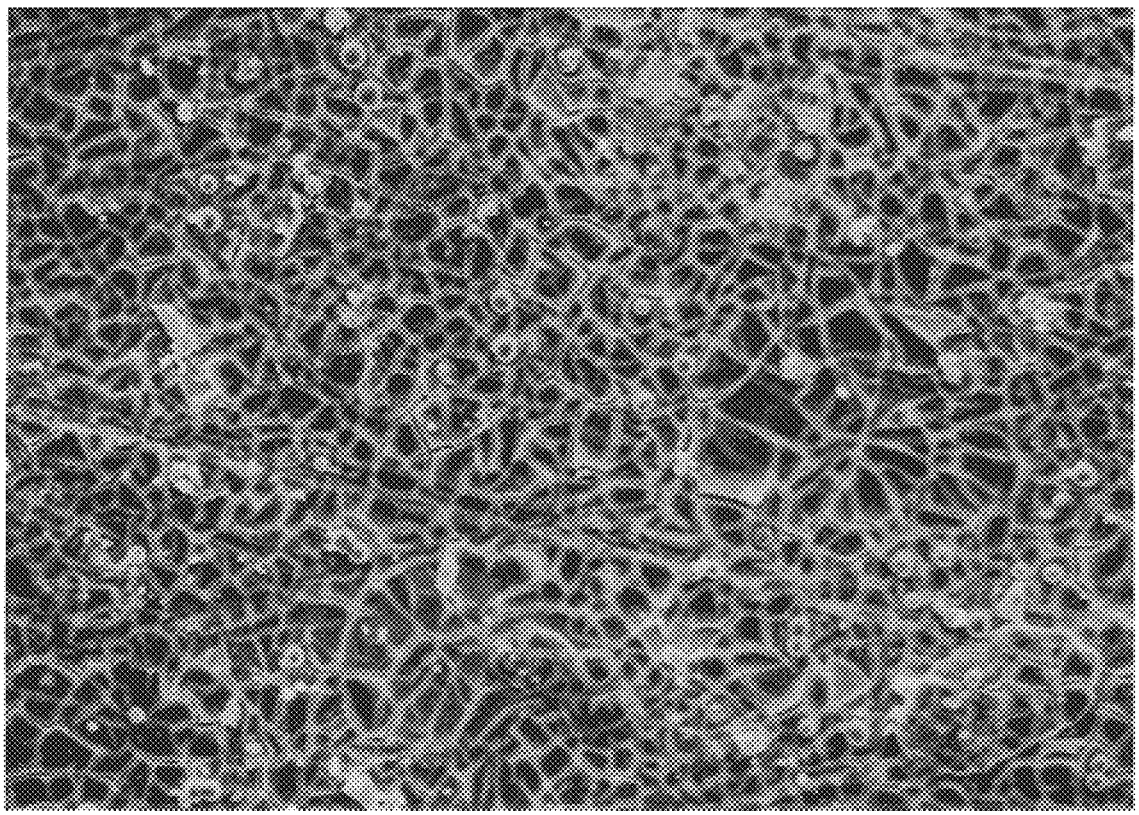
FIGS. 8 and 9 are photographs taken through an electron microscope at 500x and 5,000x, respectively, showing the surface condition of a ruthenium oxide coating produced from an ultrasonically generated aerosol/mist according to the present invention.
Figure 9:
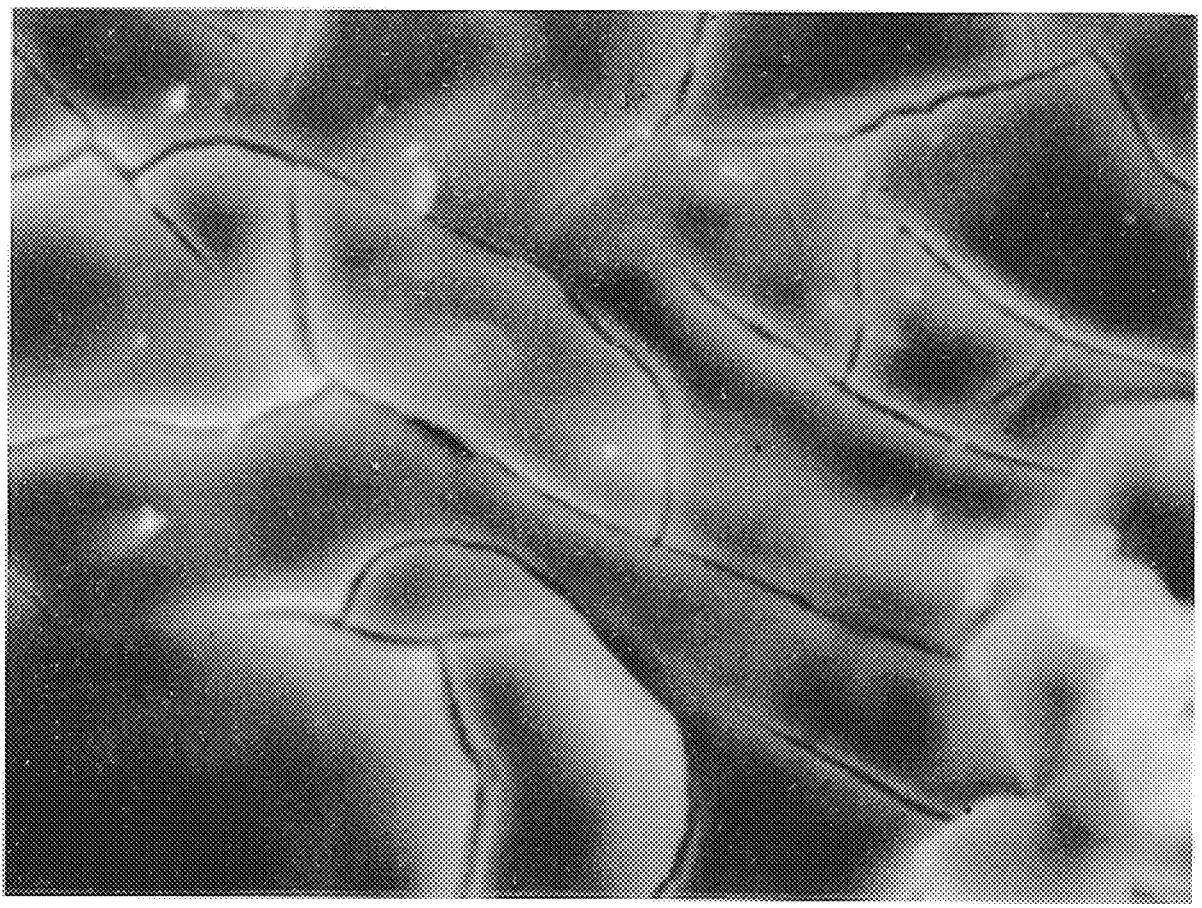

FIGS. 6 and 7 are photographs taken through an electron microscope at 500x and 5,000x, respectively, showing the surface condition of a ruthenium oxide coating produced by dipping according to the prior art. FIGS. 8 and 9 are photographs taken through an electron microscope at 500x and 5,000x, respectively, showing the surface condition of a ruthenium oxide coating produced from an ultrasonically generated aerosol/mist according to the present invention.

As is apparent, the film morphology of the present coatings is different than that of the prior art coating. The prior art coatings have a "cracked mud" appearance while the present coatings have the same "cracked mud" appearance plus additional structures on the "cracked mud" area. The cracks of the present coatings are also higher in density and thus they have an increased surface area.

Figure 10:
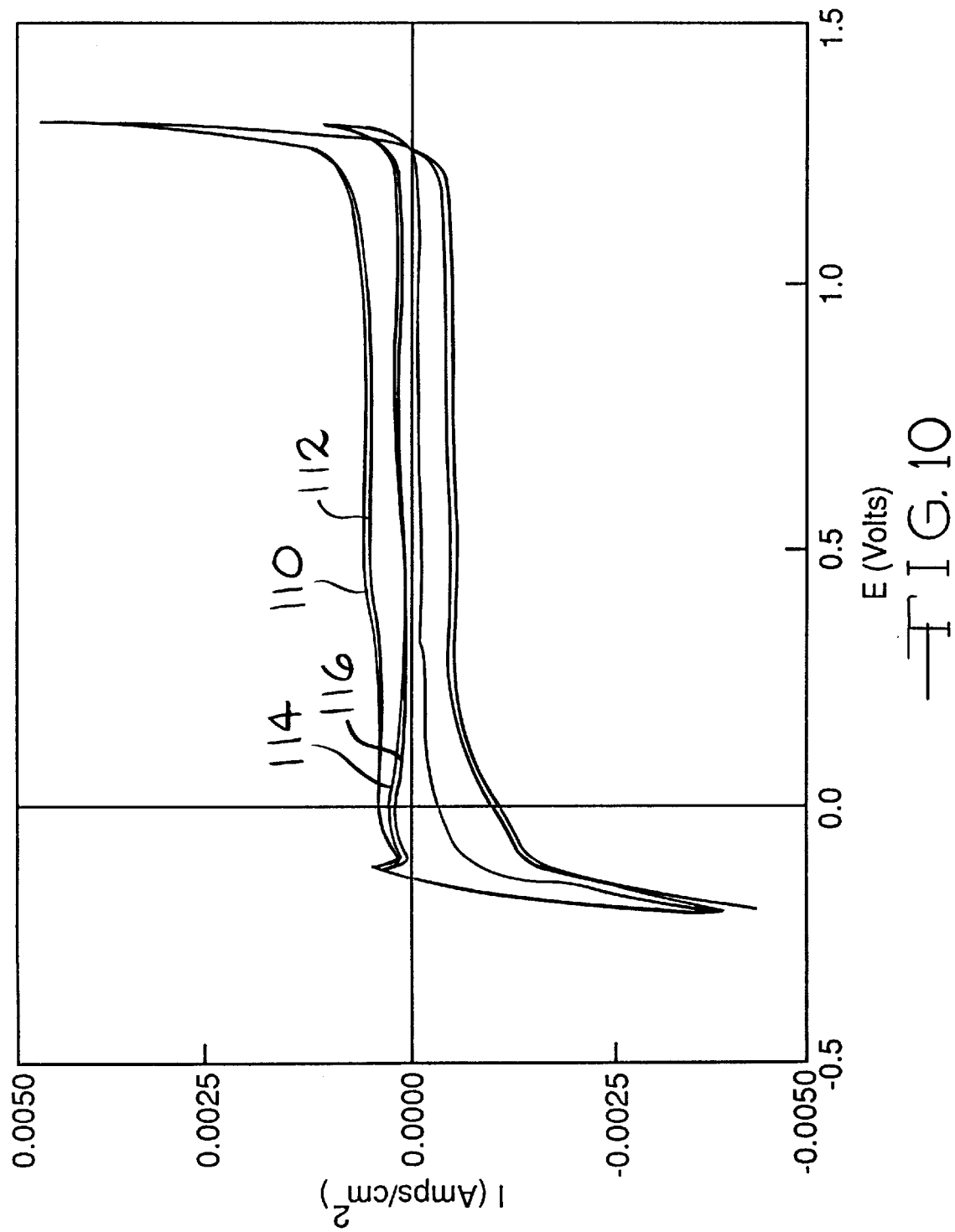
FIG. 10 is a graph of the direct current capacitance of capacitors built according to the present invention in comparison to capacitors according to the prior art using the cyclic voltammetry technique.

FIG. 10 is a graph of the current versus voltage of various capacitors built according to the present invention and built according to the prior art. The present invention capacitors contained electrodes made according to Example I. The prior art capacitors contained electrodes made by high pressure air atomization or nebulization of a ruthenium chloride solution that was subsequently heated to form a ruthenium oxide coating. In particular, curves 110 and 112 where constructed from the cyclic voltammetry scans of the respective present invention capacitors while curves 114 and 116 were constructed from the cyclic voltammetry scans of the two prior art capacitors. The scan rate was 10 mV/sec.

It has been determined that the capacitance obtained from a capacitor having an electrode made according to the present invention is in the range of about 50 to 900 Farad/gram (F/g.) of coating material as measured by the cyclic voltammetry technique. The prior art capacitors used to construct curves 114 and 116 in FIG. 10 had capacitances of about 75 F/g. measured by the same technique.

It is appreciated that: various modifications to the inventive concepts described herein may be apparent to those skilled in the art without departing from the spirit and the scope of the present invention defined by the hereinafter appended claims.

What is claimed is:

1. A capacitor, which comprises:
   a) a casing;
   b) a cathode comprising a porous coating of at least a first pseudocapacitive metal compound provided on a substrate, wherein the coating is characterized as comprising particles formed from an ultrasonically generated aerosol of either the first pseudocapacitive metal compound, or a precursor thereof contacted to the substrate heated to a temperature to instantaneously solidify the first pseudocapacitive metal compound or convert the precursor to a solidified pseudocapacitive metal compound;
   c) an anode spaced from the porous cathode coating; and
   d) an electrolyte in contact with the porous cathode coating and the anode, the casing containing the anode, the cathode and the electrolyte.

2. The capacitor of claim 1 wherein the first pseudocapacitive metal compound is selected from the group consisting of an oxide, a nitride, a carbon nitride and a carbide, and mixtures thereof.

3. The capacitor of claim 1 wherein a majority of the particles have diameters of less than about 10 microns.

4. The capacitor of claim 1 wherein an internal surface area of the coating is about 10 $m^2$/gram to about 150 $m^2$/gram.

5. The capacitor of claim 1 wherein the coating has a thickness of about a hundred Angstroms to about 0.1 millimeters.

6. The capacitor of claim 1 wherein the casing comprises a metal and the porous coating is provided directly on an inside surface of the casing.

7. The capacitor of claim 1 wherein a first metal of the pseudocapacitive compound is selected from the group consisting of ruthenium, molybdenum, tungsten, tantalum, cobalt, manganese, nickel, iridium, iron, titanium, zirconium, hafnium, rhodium, vanadium, osmium, palladium, platinum and niobium, and mixtures thereof.

8. The capacitor of claim 1 wherein the porous coating includes a mixture of at least one oxide chosen from the group consisting of oxides of ruthenium, molybdenum, tungsten, tantalum, cobalt, manganese, iron, iridium, nickel, titanium, zirconium, hafnium, rhodium, vanadium, osmium, palladium, platinum and niobium, and at least one oxide chosen from the group consisting of oxides of tantalum, titanium, nickel, iridium, platinum, palladium, gold, silver, cobalt, molybdenum, niobium, ruthenium, manganese, tungsten, iron, zirconium, hafnium, rhodium, vanadium and osmium.

9. The capacitor of claim 1 wherein the porous coating includes a mixture of oxides of ruthenium and tantalum.

10. The capacitor of claim 1 wherein the porous coating is formed by depositing the ultrasonically generated aerosol of the precursor of the first pseudocapacitive metal compound to the heated substrate in air or an oxygen containing atmosphere.

11. The capacitor of claim 1 wherein the anode is selected from the group consisting of tantalum, aluminum, niobium, zirconium and titanium, and mixtures thereof.

12. The capacitor of claim 1 wherein the anode is of a pseudocapacitive metal compound.

13. The capacitor of claim 1 is an electrochemical capacitor.

14. The capacitor of claim 1 having an unipolar configuration.

15. The capacitor of claim 1 having a bipolar configuration.

16. The capacitor of claim 1 having a spirally wound configuration.

17. The capacitor of claim 1 is an electrolytic capacitor.

18. The capacitor of claim 17 wherein the anode is selected from the group consisting of tantalum, titanium, aluminum, niobium, zirconium, hafnium, tungsten, molybdenum, vanadium, silicon and germanium, and mixtures thereof.

* * * * *